April 27, 1954     W. J. ZENNER     2,677,013
NUMBERING TRANSMITTER
Filed Feb. 5, 1952     2 Sheets-Sheet 1
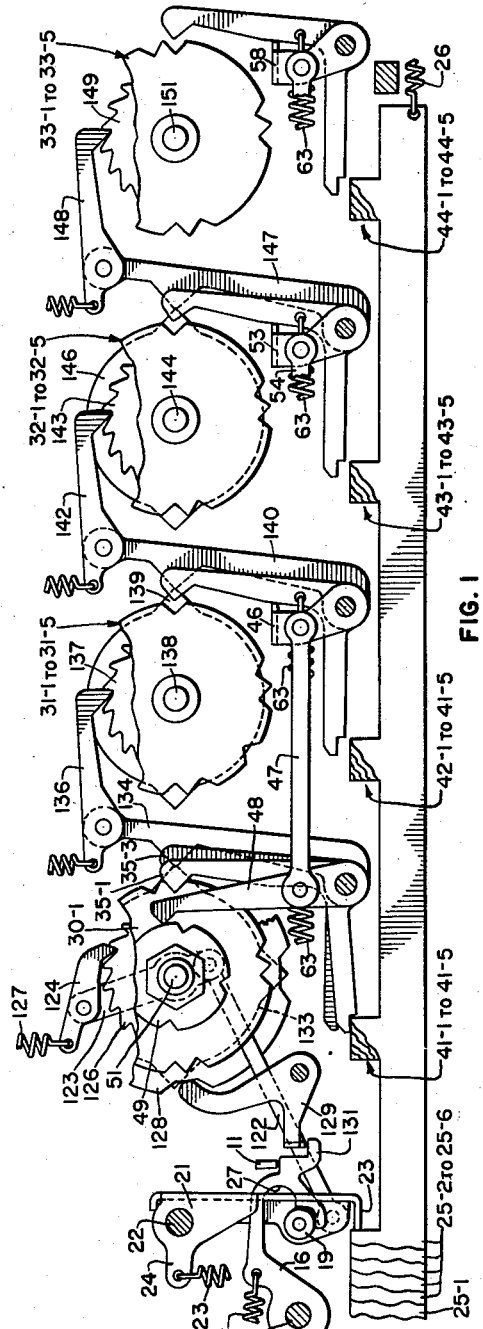
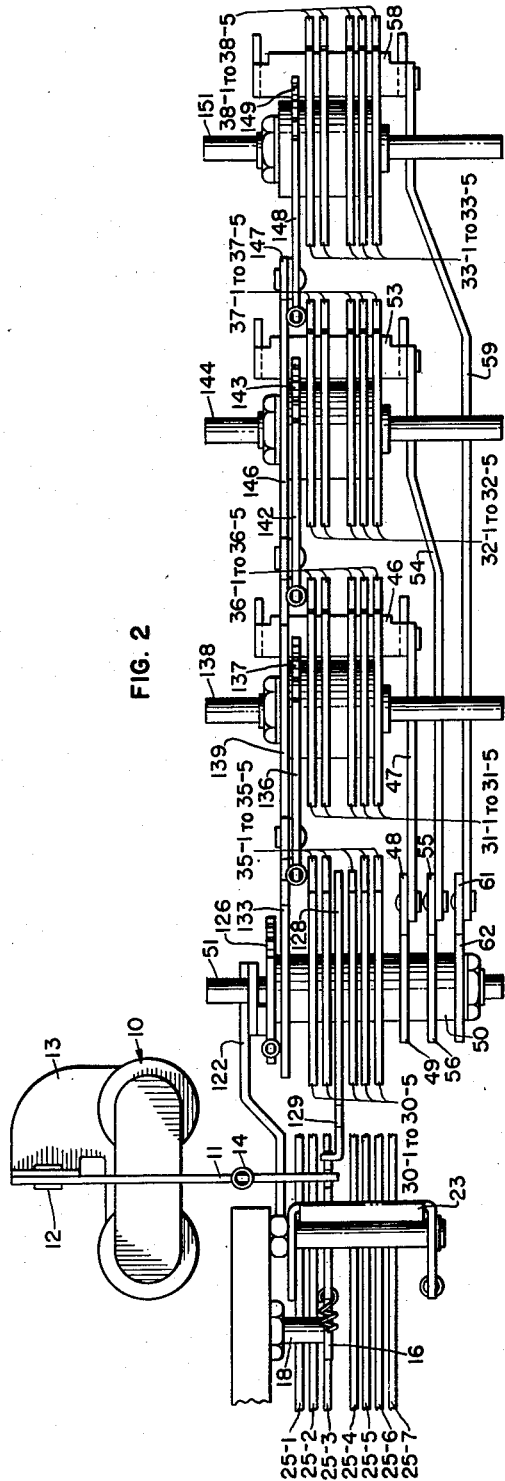
INVENTOR
WALTER J. ZENNER
BY *Emery Robinson*
ATTORNEY April 27, 1954     W. J. ZENNER     2,677,013
NUMBERING TRANSMITTER
Filed Feb. 5, 1952     2 Sheets-Sheet 2
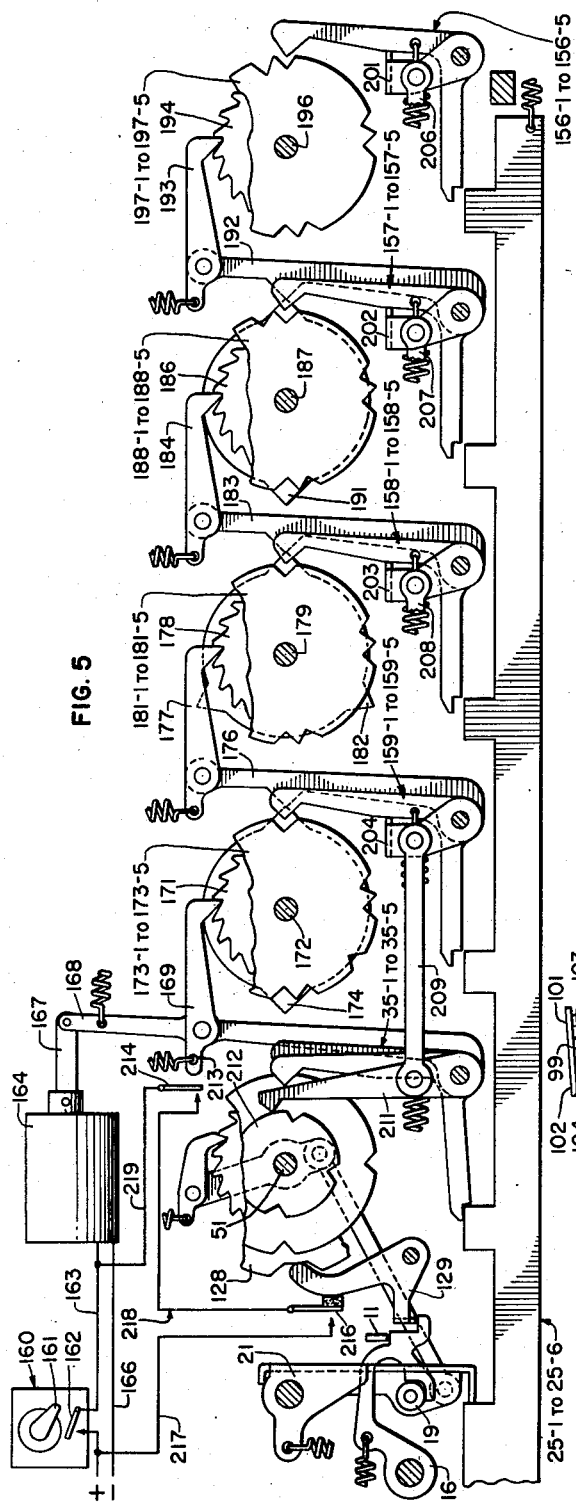
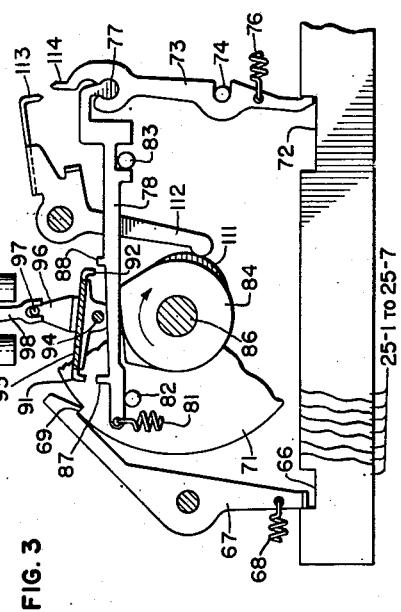
INVENTOR
WALTER J. ZENNER
BY *Emery Robinson*
ATTORNEY

Patented Apr. 27, 1954

2,677,013

UNITED STATES PATENT OFFICE 2,677,013

NUMBERING TRANSMITTER

Walter J. Zenner, Des Plaines, Ill., assignor to Teletype Corporation, Chicago, Ill., a corporation of Delaware Application February 5, 1952, Serial No. 269,919

18 Claims. (Cl. 178—17)

This invention relates to numbering transmitters and more particularly to telegraph transmitters adapted to transmit different multi-digital numbers during each cycle of operation.

In the operation of telegraph systems, it often becomes expedient to identify transmitted messages with a numerical designation preceding the body of the message. The use of these numerical designations facilitates the handling of the message during the routing of each message to its ultimate destination and further the messages identity may be enhanced by merely referring to the numerical designation. Heretofore auxiliary numbering transmitters have been devised to be used with regular message transmitters wherein coded drums are utilized to close spring contacts associated with each drum whereby electrical circuits are completed to cause consecutive multi-digit numbers to be generated upon consecutive operations of the auxiliary transmitter. While these numbering transmitters have in general proved satisfactory, they have necessitated the employment of considerable circuits of pronounced complexity consequently requiring frequent servicing by skilled technicians.

It is a primary object of this invention to provide a mechanically operated numbering transmitter.

It is a further object of this invention to provide a numbering transmitter utilizing coded units for regulating the movement of mechanical elements to control the generation of signals.

Another object of this invention is the provision of an automatic transmitter employing mechanical instrumentalities for controlling the generation of signals representative of functions and multi-digital numbers.

Automatic transmitters also find additional utility in providing means for transmitting signals denoting the readings or settings of clocks, flow meters, wattmeters, or other types of indicators or meters located at various remote stations or installations.

It is, therefore, a further feature of this invention to provide an automatically controlled transmitter for transmitting signals indicative of the setting or reading of a clock, meter or indicator.

A more specific object of the invention resides in provision of means for storing a change in the setting or reading of a clock, meter or indicator during the transmission of signals indicative of the prior setting of the said clock, meter or indicator.

With these and other objects in view the present invention contemplates the use of a numbering transmitter employing a plurality of sets of coded disks having indicia thereon representative of intelligence signals. Associated with each set of coded disks is a set of follower elements adapted to control the permutative setting of a plurality of reciprocating selector bars. The permutative setting assumed by the selector bars in response to the permutative setting of the follower elements is utilized to control the generation of permutative intelligence signals. The first set of coded disks is provided to control the selector bars to assume permutative sets representative of control functions such as "Figures, Letters, etc." whereas the remainder of the sets of coded disks are utilized to control the permutative setting of the selector bars to assume settings representative of numerical digits. Upon completion of transmission of a series of signals representative of a multi-digital number, means are actuated to cause the coded disks to be advanced to represent the next consecutive number.

In an alternative embodiment of the invention, electrical control means are provided to be actuated by an extraneous source of motive power such as a clock, meter or indicator to cause the sets of coded disks having numerical indicia thereon to be advanced in one step increments whereby consecutive advancements of the sets of coded disks represent consecutive numbers.

Other objects and advantages of the present invention will be apparent in the following detailed description when considered in conjunction with the accompanying drawings wherein:

Fig. 1 is a side elevational view partially in section showing the coded disks and the elements controlled thereby embodying the principal features of a numbering transmitter comprising the invention;

Fig. 2 is a top plan view of that portion of the numbering transmitter shown in Fig. 1, illustrating all of the coded disks and the means for sequentially controlling the transmitter;

Fig. 3 is a side elevational view partially in section showing a signal generator controlled by the permutative setting of the selector bars shown in Fig. 1;

Fig. 4 is a side elevational view of an eccentrically operated means for periodically reciprocating the selector bars; and Fig. 5 illustrates an alternative embodiment of the invention wherein the coded disks are advanced in response to the movement of some extraneous apparatus.

Referring to the drawings and more particularly to Fig. 2, there is shown an electromagnet represented by the reference numeral 10 adapted to control the position of an armature 11 pivotally mounted by a stud 12 to a bracket 13 secured to the frame of the apparatus (not shown). Energizing impulses for the electromagnet 10 are supplied from any suitable source such as a special circuit adapted to be actuated by any of the well known types of telegraph transmitters. Upon energization of the electromagnet 10, the armature 11 is drawn down against the action of a tension spring 14 to engage and move a holding latch 16.

Referring now to Fig. 1, it may be seen that engagement of the armature 11 with the holding latch 16 pivots the holding latch against the biasing effect of a spring 17 about a pivot shaft 18 until the holding latch strikes a stud 19 attached to a holding bail 21 whereupon the bail pivots about a pivot 22 through the agency of tension spring 23 attached at one end to an arm 24 extending from the bail 21. Bail 21 has formed on its lower extremity an elongated blade 23 which spans and engages a plurality of selector bars 25-1 to 25-7. Each of the selector bars 25-1 to 25-6 are urged toward the right as viewed in Fig. 1 by means of extended tension springs 26 individually connected to each selector bar. The selector bar 25-7 does not move because it is fixed to some portion of the frame. It is to be noted that when the stud 19 struck the holding latch 16, the stud was positioned in register with a recessed arcuate slot 27 formed in the holding latch 16. Consequently the force exerted by the springs 26 through the selector bars 25-1 to 25-6 on the bail 21 and the force exerted by the extended tension spring 23 causes the bail 21 to pivot in a counterclockwise direction thereby allowing the springs 26 to move the selector bars toward the right.

Positioned to the right of the holding bail 21 are a plurality of sets of coded disks 30-1 to 30-5, 31-1 to 31-5, 32-1 to 32-5, and 33-1 to 33-5. Each set of coded disks has associated therewith a set of L-shaped disk followers 35-1 to 35-5, 36-1 to 36-5, 37-1 to 37-5, and 38-1 to 38-5. Each coded disk has formed on its periphery surface certain indicia indicative of an intelligence signal impulse. In the present invention as disclosed in the drawings, this indicia takes the form of notches formed in the periphery of the disk but it is easily within the providence of any one skilled in the art to provide coded disks with indicia in the form of projections on the coded disks to indicate the inteligence signal impulses, further it is also within the providence of one skilled in the art to substitute coded drums having indentations or projections formed therein or thereon in place of the disclosed notched coded disks.

In the rest position of the apparatus, as shown in Figs. 1 and 2, the followers 35-1 to 35-5 are permutatively positioned in accordance with the coded indicia on the set of disks 30-1 to 30-5. Positioned beneath a notch formed in each free end of the L-shaped followers 35-1 to 35-5, 36-1 to 36-5, 37-1 to 37-5, and 38-1 to 38-5 are projections 41-1 to 41-5, 42-1 to 42-5, 43-1 to 43-5, and 44-1 to 44-5, respectively, formed on the selector bars 25-2 to 25-6. Engaging the L-shaped follower 36-1 to 36-5 is a pivotally mounted holding bail 46 having connected thereto a link 47. The link 47 is connected to a pivotally mounted follower arm 48 which is adapted to follow the periphery of a cam 49 mounted on a sleeve 50 rotatably mounted on a sequence shaft 51. In the unoperated position shown in Fig. 1 and 2, the follower 48 rides upon the high portion of the sequence cam 49 to hold the bail 46 in engagement with the followers 36-1 to 36-5 in such a manner as to hold these followers 36-1 to 36-5 from engagement with the peripheries of the coded disks 31-1 to 31-5. In a similar manner, the disk followers 37-1 to 37-5 are held from engagement with the coded disks 32-1 to 32-5 by means of a bail 53 having connected thereto a link 54. Again, the link 54 is connected to a follower 55 which is adapted to follow the periphery of a sequence cam 56 mounted on sleeve 50. In the unoperated position, the follower 55 rides upon the high part of the sequence cam 56 and as a result holds the followers 37-1 to 37-5 from engagement with the set of coded disks 32-1 to 32-5. A holding bail 58 is adapted to engage and hold the L-shaped followers 38-1 to 38-5 from engagement with the set of coded disks 33-1 to 33-5. The bail 58 is held in position through the instrumentality of a link 59 connected to a follower 61 adapted to follow the periphery of a sequence cam 62 fixed to the sleeve 50. In the unoperated position, as shown in Fig. 1, the follower 61 rides upon the high part of the sequence cam 62 to hold the L-shaped followers 38-1 to 38-5 from engagement with the periphery of the associated set of coded disks 33-1 to 33-5.

Each one of the individual L-shaped cam followers is provided with a small individual spring 63 functioning to urge the respective L-shaped followers into engagement with the periphery of the associated sets of coded disks. In the unoperated position of the transmitter as shown in Fig. 1 and Fig. 2, the L-shaped followers 35-1 to 35-5 are urged into engagement with the periphery surface of the set of coded disks 30-1 to 30-5 and the L-shaped followers 35-1, 35-2, 35-4 and 35-5 perceive recesses formed in the coded disks 30-1, 30-2, 30-4 and 30-5 and consequently are pivoted under the influence of the spring 63 in a counterclockwise direction to bring the notched portions into engagement with the projections 41-1, 41-2, 41-4 and 41-5 of the selector bars 25-2, 25-3, 25-5, and 25-6. Thus when the armature 11 is drawn down to move the latch 16, the bail 21 pivots in a counterclockwise direction to allow the coded bars 25-1 to 25-6 to move towards the right under the influence of the extended individual springs 26. However, the selector bars 25-2, 25-3, 25-5 and 25-6 are prevented from movement by the blocking effect of the notched portions of the followers 35-1, 35-2, 35-4 and 35-5. The selector bars 25-2 to 25-6 are now permutatively positioned in accordance with the permutation of indicia on the set of coded disks 30-1 to 30-5.

Referring now to Fig. 3, there is shown a signal generator of the same general type shown and described in great detail in the copending application of W. J. Zenner entitled "Telegraph Keyboard Transmitter," Serial Number 95,964 filed May 28, 1949 now U. S. Patent No. 2,607,848 dated August 19, 1952. The description and disclosure contained in this copending application is hereby incorporated by reference into the present description. The selector bar 25-1 is utilized to initiate operation of the signal generator and has formed in its left extremity a notch 66 into which is positioned a clutch release latch lever 67. A relatively weak spring 68 in comparison to the spring 26 connected to the selector bar 25-1 is connected to the clutch release latch lever 67 to urge this lever into engagement with the forward wall of the notch 66. Upon release of the holding bail 21, the selector bar 25-1 moves toward the right as viewed in Figs. 1, 2 and 3 to pivot the clutch release latch lever 67 in a counterclockwise direction to withdraw a notched portion 69 from engagement with a clutch 71 which may be of a friction disc type, well known in the telegraph art, or of the type shown in the patent to A. N. Nilson et al. No. 2,568,249 dated September 18, 1951. The only requirement of this clutch 71 being the ability to be instantaneously engaged upon actuation of the clutch release latch lever 67 and that it be disengaged upon movement of the clutch release latch lever 67 to the initial position.

Each of the selector bars 25-1 to 25-7 is also provided on its upper edge with a notch 72 (Fig. 3) which cooperates with the lower extremity of a transfer lever 73. Levers 73 are pivotally mounted on a suitably supported pivot rod 74 and are urged in a counterclockwise direction by individual springs 76. In the unoperated position, the transfer levers 73 are normally held against the action of the spring 76 by the right walls of the notches 72 formed in the selector bars 25-1 to 25-7 and when the selector bars are permitted to move rightwardly the associated transfer levers 73 are permitted to rotate counterclockwise a predetermined amount under the action of the individual springs 76.

Pivotally articulated within an arcuate slot 77 formed in the upper portion of each transfer lever 73 is an interponent member 78. Each transfer lever 73 and associated interponent are maintained in cooperative relationship by the particular connection between these elements which is a circular section formed on each interponent member 78 fitted within the arcuate slot formed in each transfer lever 73. A tension spring 81 is connected to each free end of the interponent members 78 to urge said interponent members into engagement with a pair of spaced guide rods 82 and 83. Each interponent member 78 is adapted to cooperate with an individual cam 84 fixed to a power shaft 86. Only one cam 84 is shown but it is to be understood that six other identically shaped cams are also mounted on the power shaft 86. Formed on each interponent member 78 is a pair of marking and spacing abutments 87 and 88, respectively, adapted to cooperate under predetermined conditions with a pair of depending flanges 91 and 92, respectively, of a rocker member 93 pivotally mounted on a pivot shaft 94. Rocker member 93 is formed to provide an upstanding arm 96 having a pin 97 secured to its upper extremity. Pin 97 is positioned within bifurcations forming part of a contact rocker 98 pivotally mounted on a rod 99. Contact rocker member 98 has a pair of laterally extending arms 101 and 102 adapted to carry contact elements 103 and 104 into engagement with transmitting contacts 106 and 107, respectively.

Cams 84, seven of which are provided in the present embodiment of the invention, have projections formed thereon which are arranged helically so that upon rotation of the power shaft 86 the cams are rotated to successively present their projecting portions to the interponent members 78 whereby the interponents are successively oscillated. Thus if the selector bars 25-2 to 25-6 are not permitted to move rightwardly because the projections formed thereon are engaged by the L-shaped followers of one set of coded disks then the associated interponents 78 will remain in the positions shown in Fig. 3 with the abutments 87 in alignment with the flange 91 of the rocker member 93. Therefore, when the cams 84 are rotated, the interponents are oscillated upwardly to bring the abutments 87 into engagement with the flange 91, to rotate the rocker member 96 in a clockwise direction if the rocker member 96 has not already been positioned in its clockwise position. On the other hand, if the selector bars 25-2 to 25-6 are permitted to move rightwardly then the associated interponents will be moved towards the left by the transfer levers 73 to bring the abutments 88 into alignment with the flange 92 of the rocker member 93. Therefore, when the cams 84 are rotated, the interponents 78 associated therewith will be oscillated to bring the abutments 88 into engagement with the flange 92 to rotate the rocker member in a counterclockwise direction.

It may be therefore appreciated that when the selector bars 25-2 to 25-6 assume a permutative setting in accordance with the coded indicia on any one of the sets of coded disks this permutative setting is transferred through the instrumentality of the transfer levers 73 to the interponents 78. Consequently, when the interponents 78 assume a permutative position, then the subsequent rotation of the cams 84 successively bring either abutment 87 or 88 into engagement with the respective flanges 91 and 92 to successively rotate the rocker member 96 in a clockwise or counterclockwise direction in accordance with the permutative setting of the interponents 78. Upon the interponents 78 assuming a permutative position, a cam 111 pivots a locking lever 112 in a clockwise direction to bring a locking bar 113, formed integral therewith, into position to engage with the left or right side of pointed ends 114 of the transfer levers 73, depending upon the permutative setting of the transfer levers 73. The function of the locking bar 113 is to hold the permutative setting of the transfer levers during the successive operation of the cams 84, even though the selector bars 25-1 to 25-6 may be returned to the initial position before the operation of all of the cams 84.

In the embodiment of the invention herein described contacts 104 and 107 function as marking or current contacts and the contacts 103 and 106 function as no current or spacing contacts. It is to be understood that the contacts 106 and 107 are connected within the transmission circuit of any telegraph system. Therefore, closing of either of these contacts applies to either a marking or spacing condition to the transmission circuit. Although the invention is described wherein the contacts are either connected to battery or not to battery, it is to be understood that the contact 107 could be connected to positive battery and the contact 106 could be connected to negative battery to cause the operation of a polar telegraph transmission circuit.

There is mounted on the power shaft 86 an eccentric 116 (see Fig. 4) positioned within a yoke 117 of an arm 118 having a hook 119 formed on its right end. The arm 118 is adapted to pass through an aperture 121 formed in the holding bail 21. The eccentric 116 is adapted to move the arm 118 towards the left subsequent to the engagement of the locking bar 113 with the pointed ends 114 of the transfer levers 73. Movement of the arm 118 towards the left moves the hook 119 into engagement with the bail 21 to move the bail 21 in a clockwise direction to move all of the selector bars 25-1 to 25-6 towards the left and hence to the initial position. The eccentric 116 functions to hold the selector bars in the initial position until such time as the cams 84 have all functioned to oscillate their respective interponent members 78 whereupon the eccentric 116 functions to move the arm 118 towards the right and as a result the bail 21 is moved in a counterclockwise direction. Movement of the bail 21 in the counterclockwise direction again permits the individual selector bars 25-1 to 25-6 to move towards the right under the influence of the extended tension springs 26 and thus assume another permutative setting in accordance with the permutative indicia of a set of coded disks.

Returning now to Fig. 1, there is shown a link 122 connected at one end to the bail 21 and at its other end to a lever 123. The lever 123 is pivotally mounted about the sequence shaft 51 and has pivotally mounted on its free end a feed pawl 124 adapted to cooperate with the teeth of a ratchet 126 fixed to the sleeve 58. A spring 127 engages and biases the pawl 124 into engagement with the teeth of the ratchet 126. Manifestly, each time the bail 21 is oscillated by the eccentric 116 the feed pawl 124 advances the ratchet 126 and as a consequence all of the cams 49, 56, 62 and the coded disks 30-1 to 30-5 are advanced one increment. Also mounted on the sleeve 58 and secured thereto is a locking cam 128 adapted to control the position of a V-shaped locking member 129. When the locking cam 128 is advanced one increment by the pawl 124 and ratchet 126, the locking member 129 is moved from a low portion of the cam 128 to a high portion thereby pivoting the locking member 129 in a counterclockwise direction and into engagement with an extending tip 131 of the holding latch 16. The holding latch 16 is thereby held in an unlatched position during the period in which the locking member 129 engages the tip 131 thereby permitting subsequent oscillation of the bail 12 by the eccentric 116.

In operation of the numbering transmitter, an energizing impulse is received by the electromagnet 18 to cause the electromagnet to draw down its armature to engage and move the holding latch 16 from engagement with the stud 19. Released, the stud 19 permits the bail 21 to move in a counterclockwise direction under the influence of its spring 23 whereupon the selector bars 25-1 to 25-6 are moved towards the right as viewed in Fig. 1 under the influence of extended springs 26. The L-shaped followers 35-1 to 35-5 are permutatively positioned in accordance with the coded indicia on the coded disks 30-1 to 30-5. As shown in the present embodiment of the invention the coded disks 30-1, 30-2, 30-4 and 30-5 have indentations formed therein. Consequently the followers 35-1, 35-2, 35-4 and 35-5 pivot in a counterclockwise direction under the influence of the springs 63 to bring the notched portion into engagement with the projections 41-1, 41-2, 41-4 and 41-5 formed on the selector bars 25-2, 25-3, 25-5 and 25-6 to prevent these coded bars from moving towards the right. The permutative setting of the selector bars 25-1 to 25-7 is imparted to the transfer levers 73 to permutatively position the interponents 78. The selector bar 25-1 has no projections formed thereon and as a consequence invariably moves toward the right upon each counterclockwise movement of the bail 21. Movement of the selector bar 25-1 not only positions its associated transfer lever 73 but also pivots the clutch release lever 67 in a counterclockwise direction to remove the notched portion 69 from the clutch 71. Release of the clutch 71 instantaneously allows power from a suitable source such as an electric motor to be imparted to the cam shaft 86. Rotation of the cam shaft 86 causes rotation of the cams mounted thereon and hence the high portions of the cams 84 are successively presented to the permutatively positioned interponents 78 to successively move the abutments 87 or 88 into engagement with the aligned flanges 91 or 92. It may be therefore readily appreciated that the rocker member 93 is successively positioned in accordance with the movement of either the abutment 87 or the abutment 88 into engagement with the respective flanges 91 or 92. Movement of the rocker member 93 is imparted to a contact rocker 98 to control the making or breaking of contacts 104 and 107 or the contacts 103 and 106. Thus, the contacts are successively closed in accordance with the permutative setting of the selector bars 25-1 to 25-7. This setting is representative of a "Figures" signal in accordance with the Baudot code and as a consequence a "Figures" signal is imparted to the transmission circuit.

The selector bar 25-7 is fixed to hold its transfer lever and interponent in such a position that the abutment 87 is maintained in alignment with the flange 91. Consequently, in each series of rotation of the cams 84, the abutment 87 on the interponent 78 associated with the selector bar 25-7 is moved into engagement with the flange 91 to cause the contacts 104 and 107 to close to impart a marking condition to the transmitting circuit. In use of the Baudot code, in telegraph apparatus, each intelligence signal comprises a spacing or no current impulse followed by a series of permutative impulses and then by a stop current or marking signal. It may be therefore understood that the selector bar 25-7 is utilized to provide a stop impulse for each intelligence signal transmitted by the apparatus. This is accomplished by having the cam which actuates the interponent 78 associated with the selector bar 25-7 functioning subsequent to the transmission of each permutative series of impulses.

The start impulse for each series of signals is provided by having the selector bar 25-1 move towards the right each time the bail 21 is moved in a counterclockwise direction. As previously indicated, movement of the selector bar 25-1 towards the right permits the movement of the transfer lever 73 in a counterclockwise direction to move the interponent 78 to such an extent as to position the abutment 88 in alignment with the flange 92. The cam 84 associated with the selector bar 25-1 moves its lobed portion into engagement with its interponents 78 immediately following the permutative setting of the interponent 78 and as a consequence the abutment 88 is moved into engagement with the flange 92 to cause the contact 103 to move into engagement with the contact 106 to impart a spacing or no current impulse to the transmitting circuit. This spacing or no current impulse is utilized as a start impulse and is imparted to the transmitting circuit prior to the permutative intelligence impulses.

As soon as the transfer levers 73 are locked in position by the locking bar 113, the eccentric 116 moves the arm 118 and bail 21 towards the left to return all of the selector bars 25-1 to 25-6 to the initial position. Movement of the bail also moves the link 122 and the lever 123 to engage the pawl 124 with a tooth of a ratchet 126 to advance the ratchet and all of the cams mounted on the sequence sleeve 50. Followers 35-1, 35-2, 35-4 and 35-5 are moved from within the recesses in the coded disks 30-1, 30-2, 30-4 and 30-5 to high portions of the coded disks. Therefore, all of the followers 35-1 to 35-5 are positioned on high portions of the disks 30-1 to 30-5 and as a result their trailing arms are no longer in position to block any of the selector bars 25-2 to 25-6. Simultaneously, the follower 61 falls within a notch formed in the sequence cam 62 to move the link 59 towards the left and hence remove the bail 58 from engagement with the followers 38-1 to 38-5. The followers 38-1 to 38-5 are immediately permutatively positioned in accordance with the coded indicia on the coded disks 33-1 to 33-5. The eccentric 116 now functions to release bail 21 and hence the coded bars 25-2 to 25-6 are permutatively blocked in accordance with the followers 38-1 to 38-5 being permutatively positioned within the coded recesses in the coded disks 33-1 to 33-5. Movement of the selector bar 25-1 which occurs upon every release of the bail 21 again causes the clutch release lever to pivot to allow the clutch 71 to remain engaged. Upon completion of transmission of the first complete intelligence signal, the locking bar 113 is removed from engagement with the pins 114 and the interponents 73 are permutatively positioned in accordance with the permutative positions assumed by the selector bars 25-1 to 25-7 and another intelligence signal is thereupon transmitted by the single generator shown in Fig. 3.

Upon completion of the transmission of the second signal which is indicative of a hundreds digit, the sequence cam 56 is rendered effective to move the bail 53 from the followers 37-1 to 37-5 and as a result the followers are permutatively positioned in accordance with the coded indicia on the coded disks 32-1 to 32-5. The coded indicia on the coded disks 32-1 to 32-5 is indicative of the tens digit of a multi-digit number. Movement of the follows 37-1 to 37-5 into the permutative position controls the permutative setting of the selector bars 25-2 to 25-6 and as previously discussed this permutative setting of the selector bars is utilized to control the generation of an intelligence signal by the signal generator shown in Fig. 3.

Upon completion of the transmission of the intelligence signal representative of the tens digit, the sequence cam 49 is rendered effective to remove the bail 46 from engagement with the followers 36-1 to 36-5 and as a result these followers are permutatively positioned in accordance with the coded indicia on the coded disks 31-1 to 31-5. The coded indicia on the coded disks 31-1 to 31-5 is representative of units digit. Therefore, the followers 36-1 to 36-5 are permutatively positioned to control the permutative setting of the selector bars 25-2 to 25-6. The permutative position assumed by the selector bars 25-1 to 25-7 controls the signal generator shown in Fig. 3 to cause the generation of a signal representative of a units digit.

Following the transmission of all of the digits of the multi-digit number, the coded disks 30-1 to 30-5 are again advanced and rendered effective to control the permutative setting of the selector bars 25-2 to 25-6. However, the intelligence signal now to be transmitted is a Letters signal which according to the Baudot code has five marking impulses. In order to obtain this signal, all of the followers 35-1 to 35-5 are moved into blocking position and as a result all of the selector bars 25-2 to 25-6 are held against movement towards the right to cause the signal generator shown in Fig. 3 to generate a spacing start signal followed by five marking intelligence impulses and then by a marking stop signal impulse.

It is to be noted that for the complete transmission of a three digit number five signals are transmitted, hence the ratchet 126 is advanced five increments for each complete cycle of operation of the transmitter. The ratchets and the cams are so arranged that five advancements of the ratchet cause the coded disks 30-1 to 30-5 and sequence cams 49, 56 and 61 to rotate through 90°. The coded disks 30-1 to 30-5 and sequence cams are so marked or cut that each mark or cut repeats in every quadrant of the respective elements mounted on sleeve 50. Upon the cam 128 advancing five increments a second recess portion is presented to the locking member 129 causing said locking member to pivot in a clockwise direction to release the tip 131 of the holding latch 16 whereupon the stud 19 of the bail 21 engages the holding latch 16 to prevent further oscillation of the bail 21. In this condition of the apparatus, the selector bar 25-1 is positioned in its leftwardly position causing the clutch release lever 67 to pivot thereby moving the notched portion 69 into engagement with the clutch 71 to prevent further rotation of the power shaft 66 and to halt the transmission of any further intelligence signals.

Positioned on the sequence sleeve 50 and adapted to rotate therewith is an additional cam 133 which functions upon completion of transmission of each multi-digit number to pivot a follower 134. Connected to the upper extremity of the follower 134 is a pawl 136 spring biased into engagement with the teeth of a ratchet 137 fixed to a shaft 138. Shaft 138 provides a mounting for the coded disks 31-1 to 31-5, and as a result, movement of the follower 134 is imparted through the pawl 136 to the ratchet 137 to advance all of the coded disks 31-1 to 31-5 a distance of one tooth or 18°. The coded disks 31-1 to 31-5 have two series of coded indicia thereon representative of the digits 0 to 9. Movement of the coded disks 31-1 to 31-5 through 180° positions the second series of coded indicia representative of the digits 0 to 9 to control the permutative setting of the followers 36-1 to 36-5.

Mounted on the shaft 138 is a cam 139 adapted to control the position of a follower 140. The follower 140 is pivotally mounted and has pivotally mounted on one extremity thereof a spring biased pawl 142 adapted to cooperate with the teeth of a ratchet 143 fixed to a shaft 144. The coded disks 32-1 to 32-5 are fixed to the shaft 144, thus movement of the ratchet 143 by the pawl 142 advances the coded disks 32-1 to 32-5 one increment. Again the coded disks 32-1 to 32-5 have two series of consecutive coded indicia thereon representative of the digits 0 to 9.

Fixed to the shaft 144 is a cam 146 having two lobes spaced 180° apart. Adapted to follow the cam 146 is a follower 147 having pivotally secured to one extremity thereof a pawl 148 which cooperates with and advances the teeth of a ratchet 149. The ratchet 149 is fixed to a shaft 151 which also carries the coded disks 33—1 to 33–5. The coded disks 33–1 to 33–5 have two series of coded indicia formed thereon indicative of the digits 0 to 9.

Accordingly, it becomes apparent that upon completion of each transmission of a multi-digit number, the coded disks 31–1 to 31–5 are advanced one increment to present the indicia representative of the next consecutive numerical digit to the followers 36–1 to 36–5. Upon each ten advances of the coded disks 31–1 to 31–5, one of the lobes on the cam 139 is rendered effective to actuate the pawl 142 and ratchet 143 to advance the coded disks 32–1 to 32–5 one increment to present the indicia representative of the next consecutive numerical digit to the followers 37–1 to 37–5. When the coded disks 32–1 to 32–5 are advanced ten increments, one of the lobed portions of the cam 146 is rendered effective to actuate the pawl 148 and ratchet 149 to advance the coded disks 33–1 to 33–5 one increment whereby the indicia representative of the next consecutive numerical digit is positioned to control the followers 38–1 to 38–5.

In reviewing the operation of the numbering transmitter, it may be readily appreciated that the following sequence of signals are transmitted: first, a Figures signal under the control of the coded disks 30–1 to 30–5, second, a hundreds digit number under the control of the coded disks 33–1 to 33–5, third, a tens digit under the control of the coded disks 32–1 to 32–5, fourth, a units digit under the control of the coded disks 31–1 to 31–5 and finally a Letters signal under the control of the coded disks 30–1 to 30–5.

Referring to Fig. 5, there is shown an alternative embodiment of the invention for use in systems wherein it is desired to automatically transmit signals representative of the setting of a clock, meter or indicator. The apparatus shown in Fig. 5 is in many ways identical to the apparatus shown in Figs. 1 to 4 and where such parts are the same in the two embodiments, identical numerical designations of the respective parts are used. A solenoid controlled armature 11 controls the position of a latch 16 which upon release permits a bail 21 to oscillate through the instrumentality of the mechanism shown in Fig. 4. The latch 16 is locked in position through the instrumentality of a locking member 129 when said locking member rides upon the high part of the cam 128. As previously described in regard to the first embodiment of the invention the selector bars 25–2 to 25–6 are adapted to be permutatively positioned in a successive manner by sets of coded disk followers 35–1 to 35–5, 156–1 to 156–5, 157–1 to 157–5, 158–1 to 158–5, 159–1 to 159–5 and finally again by the followers 35–1 to 35–5.

In the embodiment shown in Fig. 5, the method of advancing the coded disks is not under the control of a cam on the shaft 51 but rather from an independent source which is under the control of a clock designated generally by the reference numeral 160. In this instance, the reference numeral 161 designates a cam which is rotated once every minute by the clock 160 to close a contact 162. Closure of the contact 162 completes a circuit from positive battery, through the contact 162, over a lead 163, through a solenoid 164, over a lead 166, to negative battery. Energization of the solenoid 164 draws up its armature 167 which is pivotally connected to a lever 168. Pivotally connected at the midpoint of the lever 168 is a spring biased pawl 169 urged into engagement with the teeth of a ratchet 171 mounted on a shaft 172. Also mounted on the shaft 172 is a set of coded disks 173–1 to 173–5 having coded indicia thereon representative of two series of digits 0 to 9. In addition, a two lobed cam 174 is fixed to the shaft 172 and for each ten increments of advance of the ratchet 171, a lobe is brought into engagement with a follower 176 to pivot the follower. Pivotally connected to the free end of the follower 176 is a spring biased pawl 177 adapted to engage and advance the teeth of a ratchet 178 fixed to a shaft 179. Secured to the shaft 179 is a set of coded disks 181–1 to 181–5 having three series of indicia representative of the digits 0 to 6. In addition there is secured to the shaft 179, a cam 182 having three lobes spaced 120° apart to separate each series of coded indicia.

A follower arm 183 is adapted to follow the periphery of the cam 182 and upon encountering a lobe is moved to advance a spring biased pawl 184 into engagement with the teeth of a ratchet 186. The ratchet 186 is secured to a shaft 187 which has securely fastened thereto a set of coded disks 188–1 to 188–5. The coded disks 188–1 to 188–5 have two series of coded indicia thereon representative of the digits 0 to 9. Fixed to the shaft 187 is a cam 191 having two lobes thereon spaced 180° apart to separate each series of coded indicia.

When the cam 191 advances ten increments, a lobe on the cam is brought into position to move a cam follower 192 in a clockwise direction. The movement of the follower 192 is imparted to a spring biased pawl 193 to advance a ratchet 194 fixed to a shaft 196. Secured to the shaft 196 is a set of coded disks 197–1 to 197–5 having two series of coded indicia thereon each representative of the digits 0 to 9.

Associated respectively with each set of followers 156–1 to 156–5, 157–1 to 157–5, 158–1 to 158–5, and 159–1 to 159–5 are a series of bails 201, 202, 203, and 204, adapted to be controlled respectively by the links 206, 207, 208, and 209. Each of the links are connected to separate cam followers only one of which is shown in Fig. 5 and designated by the reference numeral 211. However, it is to be understood that additional followers are provided to be connected to the other links. Each follower, such as follower 211, is adapted to follow the periphery of a sequence cam mounted on the shaft 51, only one of which is shown and is designated by the reference numeral 212.

In operation of this embodiment of the invention, the armature 11 is again moved downwardly to release the holding latch 16 to set transmitter in operation. The selector bars 25–2 to 25–6 are permutatively positioned in accordance with the permutative setting of the L-shaped followers 35–1 to 35–5. The permutative setting of the selector bars is utilized to control the actuation of the signal generator shown in Fig. 3 in an identical manner with that described in regard to the embodiment of the invention shown in Figs. 1, 2, 3, and 4.

Upon completion of transmission of the first intelligence signal, the bail 201 associated with the followers 156–1 to 156–5 is released to allow these followers to assume a permutative position in accordance with the indicia on the coded disks 197–1 to 197–5 and hence control the permutative positions assumed by selector bars 25–2 to 25–6 which controls the signal generator shown in Fig. 3. Upon the next oscillation of the bail 21, the bail 202 is withdrawn to permit the followers 157–1 to 157–5 to assume a permutative setting in accordance with the coded indicia on the coded disks 188-1 to 188-5 and hence control the permutative setting of the selector bars 25-2 to 25-6 to control the signal generator shown in Fig. 3. The next oscillation of the bail 21 withdraws the bail 203 to permit the followers 158-1 to 158-5 to assume a permutative setting in accordance with the coded indicia on the coded disks 181-1 to 181-5 and thus control the permutative position of the selector bars 25-2 to 25-6 to cause the signal generator shown in Fig. 3 to generate a signal indicative of the coded indicia on the coded disk. The next oscillation of the bail 21 effectuates a withdrawal of the bail 204 to permit the followers 159-1 to 159-5 to assume a permutative setting in accordance with the coded indicia on the coded disks 173-1 to 173-5. The next oscillation of the bail 21 again positions the followers 35-1 to 35-5 in accordance with the coded indicia on the coded disks 30-1 to 30-5 and as previously indicated all of the followers are moved into blocking position to prevent all of the coded bars 25-2 to 25-6 from moving towards the right to control the signal generator shown in Fig. 3 to produce a signal indicative of a Letters function. Upon completion of the transmission of the Letters signal the blocking member 129 is moved into position to permit the latch 16 to move upward to engage the stud 19 on the bail 21 and manifestly the apparatus then comes to rest.

An additional feature of this particular embodiment resides in a means for storing changes in indications of the clock actuated cam 161. If during the course of a transmission cycle, the cam 161 closes the contact 162, then the circuit is completed from positive battery through the now closed contact 162, over the lead 163, through the solenoid 164, over the lead 166 to negative battery as previously described. Energization of the solenoid 164 draws up its armature 167 to move the lever 168 and the pawl 169 in a counterclockwise direction. This movement of the pawl 169 causes a leftwardly extending portion 213 thereof to engage and close a contact 214. When the transmitter is in the process of transmitting signals representative of the coded indicia on the various coded disks the blocking member 129 is pivoted in a counterclockwise direction to close a contact 216. Closure of the contacts 214 and 216 completes a holding circuit for the solenoid 164 which may be traced from positive battery over a lead 217, through the now closed contact 216, over a lead 218, through the now closed contact 214, over a lead 219, through the solenoid 164, over the lead 166 to negative battery. Thus a locking circuit is provided for the solenoid 164 which maintains the solenoid 164 energized to maintain the pawl 169 in a withdrawn position. Upon completion of the transmission cycle, the locking member 129 pivots in a clockwise direction to open the contact 216 to de-energize the holding circuit for the solenoid 164, thus the pawl 169 is advanced in a clockwise direction to advance the ratchet 171 one increment to indicate the rotation of the clock actuated cam 161 during the previous transmission cycle.

A résumé of the operation of the embodiment of the invention shown in Fig. 5 reveals that this transmitter causes the transmission of a two digit number indicative of hours and a two digit number indicative of minutes. When the coded disks 181-1 to 181-5 are advanced six increments to indicate a 60 minute passage of time the next series of coded disks 188-1 to 188-5 are advanced one increment to indicate an additional hour in passage of time. It is to be understood by those skilled in the art that other means besides a clock could be utilized to actuate the cam 161. These devices could possibly take the form of a wattmeter or a flow meter or a gas meter or any other instrument used to measure a quantity.

It is to be understood that the above described arrangements of apparatus and construction of elemental parts are simply illustrative of the principles of the invention and many other modifications and changes may be made without departing from the spirit and scope of the invention.

What is claimed is:

1. In an automatic telegraph transmitter, a signal generator, a plurality of selector bars adapted to be positioned to control the signal generator, a plurality of coded units, and separate means associated with and successively positioned by each coded unit for successively controlling the positions of the selector bars in accordance with the code on each succeeding coded unit.

2. In an automatic telegraph transmitter, a signal generator, a plurality of movably mounted bars, means for periodically moving the bars into and out of position to control the signal generator, a plurality of coded units, positionable means associated with each coded unit adapted to be permutatively positioned in accordance with the code on its respective coded unit, said positionable means adapted to control the movement of said selector bars, means for normally rendering said positionable means ineffective, and means associated with each coded unit for successively rendering each positionable means effective.

3. In an automatic telegraph transmitter, a signal generator, a plurality of selector bars, means for cyclically moving the selector bars into and out of position to control the signal generator, a plurality of coded units, blocking means associated with each of said units, means associated with each of said units for holding said blocking means from said selector bars, means for successively releasing each holding means in timed relation with each cyclic movement of the selector bars, and permutative means on each coded unit for permutatively moving its associated blocking means into position to permutatively block the selector bars.

4. An automatic telegraph transmitter for transmitting a predetermined number of groups of permutative impulses representative of intelligence signals which comprises a plurality of coded units, a plurality of sets of followers, each set of followers being adapted to be permutatively positioned in accordance with the code on one coded unit, means for precluding the positioning of the followers by the coded units, means for successively rendering ineffective said precluding means associated with each coded unit, a plurality of selector bars, means for permutatively setting the selector bars in accordance with the permutative positions of the followers, and means for generating signals in accordance with each permutative setting of the selector bars.

5. In a numbering transmitter, a signal generator, a plurality of selector bars, means for reciprocating the selector bars into and out of position to control the signal generator, a plurality of units having coded indicia thereon indicative of numerals, followers associated with each coded unit and adapted to be permutatively positioned in accordance with the coded indicia on each coded unit, means for holding said followers from said coded units, and means for successively releasing said holding means following each reciprocatory movement of the selector bars whereby the selector bars are permutatively moved in accordance with the permutative positions of the followers.

6. In an automatic numbering transmitter, a signal generator, a plurality of selector bars, means for moving the selector bars into and out of position to control the signal generator, a coded unit having coded indicia thereon representative of control functions, a plurality of numerically coded units, each of said numerically coded units having combination of coded indicia thereon representative of consecutive numerical digits, a set of followers associated with each of said coded units and adapted to be permutatively positioned in accordance with the coded indicia on each associated coded unit, means for holding said sets of followers associated with said numerically coded units from said permutative positions, and means for successively releasing the holding means whereby the selector bars are permutatively positioned by the function coded unit, then by each succeeding numerically coded unit and then again by said function coded unit.

7. In an automatic telegraph transmitter, signal generating means, a plurality of selector bars, means for moving the selector bars to control the signal generating means, a plurality of sets of coded disks, means positioned in accordance with the code on each set of coded disks for blocking the movement of said selector bars, holding means associated with each set of coded disks for rendering said blocking means ineffective, and means for successively and individually releasing each holding means to successively position the blocking means to successively control the movement of the selector bars whereby the signal generating means produces telegraph signals in accordance with the codes on each set of disks.

8. In an automatic telegraph transmitter, a signal generator, a plurality of selector bars adapted to be positioned to control the signal generator, a plurality of sets of coded disks, a set of instrumentalities associated with each set of coded disks, each coded disk having indicia thereon adapted to control the position of the instrumentality associated therewith, means associated with each set of coded disks for holding said associated set of instrumentalities from said indicia, means for successively releasing the holding means associated with each set of instrumentalities, and means for moving the selector bars into the control position subsequent to each release of each holding means whereby the selector bars are permutatively blocked in accordance with the permutative positions assumed by each set of instrumentality.

9. In an automatic telegraph transmitter, a signal generator, a plurality of selector bars, means for moving the selector bars into and out of position to control the signal generator, a plurality of sets of coded disks, a set of followers associated with each set of coded disks, means associated with each set of followers for holding the respective sets of followers from the associated set of coded disks, sequence means for controlling the holding means, and means actuated by said moving means for stepping the sequence means whereby the holding means are successively released to successively permit each set of followers to be successively positioned by the set of coded disks associated therewith, each set of coded disks being adapted to permutatively position one set of followers to successively control the movement of the selector bars.

10. In an automatic telegraph transmitter, a signal generator, a plurality of selector bars, a bail engaging all of said selector bars, means for oscillating the bail to effectuate the movement of the selector bars into and out of position to control the signal generator, a plurality of coded units, each coded unit having indicia therein comprising a plurality of permutative identations, a set of followers associated with each coded unit, a bail associated with each set of followers for holding said followers from said coded units, sequence control means adapted to release the follower bails, and means actuated by the oscillating selector bar bail for advancing the sequence control means to successively release each follower bail whereby each set of followers is rendered effective to block the movement of certain of said selector bars in accordance with the indicia on each coded unit.

11. An automatic telegraph transmitter comprising a signal generator, a plurality of slidably mounted selector bars, means for reciprocating the selector bars to move into and out of position to control the signal generator, a plurality of sets of coded disks, each set of coded disks having coded indicia thereon in the form of permutations of indentations, a plurality of sets of disk followers, means for urging each disk follower into engagement with a coded disk, a bail associated with each set of disk followers, means for holding all the bails in position to hold all the sets of disk followers from engagement with the sets of disks associated therewith, sequence cams adapted to release one holding means upon each reciprocation of the selector bars, a pawl and ratchet mechanism adapted to advance the sequence cams, and means operated by said reciprocating means for actuating the pawl and ratchet mechanism to advance the sequence cams to release one holding means following each reciprocation of the selector bars.

12. In an automatic telegraph numbering transmitter, a signal generator, selector bars, means for periodically moving the selector bars into position to control the signal generator, a plurality of coded units, each coded unit having combinations of coded indicia thereon indicative of consecutive digits, means associated with each coded unit for blocking certain of said selector bars in accordance with the coded indicia on each coded unit, means for holding said blocking means from the selector bars, sequence means actuated by the selector bar moving means for successively releasing said holding means whereby the selector bars are periodically permutatively positioned in accordance with the coded indicia on each coded unit to cause the signal generator to generate signals representative of a multi-digit number, and means operated by the selector bar moving means for automatically varying the setting of said coded units in a predetermined order following each generation of a multi-digit number.

13. In an automatic telegraph numbering transmitter, a signal generator, a plurality of selector bars, a plurality of coded units, each of said coded units having combinations of coded indicia thereon indicative of consecutive numerical digits, means for moving the selector bars into position to control the signal generator, followers associated with each coded unit and adapted to be permutatively positioned to block said selector bars in accordance with a setting of coded indicia on each coded unit, means for holding said followers from the blocking positions, means for successively releasing the holding means whereby the selector bars are successively permutatively positioned in accordance with the coded indicia on each succeeding coded unit to effectuate the generation of a multi-digit number by the signal generator, and means controlled by the selector bar moving means for automatically varying the settings of combinations of coded indicia in consecutive order following each generation of a multi-digit number.

14. In an automatic telegraph numbering transmitter, a signal generator, a plurality of selector bars, means for reciprocating said selector bars into and out of position to control the signal generator, a plurality of coded units, each coded unit having combinations of coded indicia thereon representative of consecutive digits, a pawl and ratchet mechanism associated with each coded unit and adapted to advance the coded unit associated therewith, a set of followers associated with each coded unit and adapted to block certain of said selector bars from movement in accordance with the coded indicia of the coded unit associated therewith, means for holding said followers from the blocking positions, sequence means actuated by said reciprocating means for successively releasing each of the holding means whereby permutations of selector bars are successively reciprocated in accordance with the coded indicia on each coded unit to successively control the signal generator to generate signals representative of a multi-digit number, and means operated by the reciprocating means for actuating the pawl and ratchet mechanisms to vary the setting of the coded units in consecutive numerical order.

15. In an automatic telegraph transmitter, a signal generator, a plurality of selector bars adapted to be positioned to control the signal generator, a bail engaging all of the selector bars, means for oscillating the bail, means for latching the bail in position to prevent movement of the selector bars, means for releasing the latching means, means for locking the latching means in the unlatched position, means for blocking a variable permutation of the selector bars upon each cycle of operation of the oscillating means whereby the signal generator is controlled to generate permutative signals in accordance with the permutative movement of the selector bars, and means controlled by the oscillating means for releasing the locking means upon completion of a predetermined number of oscillations.

16. In an automatic telegraph transmitter, a signal generator, a plurality of movably mounted selector bars, cyclically operable means for periodically moving the selector bars into and out of position to control the signal generator, a unit having a number of series of permutatively arranged indicia thereon, a plurality of blocking elements associated with the unit and adapted to be permutatively positioned in accordance with each series of permutatively arranged indicia, and means actuated by the cyclically operable means for stepping the unit to sequentially present different permutations of indicia to accordingly position the blocking elements, each permutative positionment of the blocking elements acting to block movement of a corresponding permutation of the selector bars.

17. In a mechanism for controlling a signal generator, a plurality of selector bars, cyclically operable means for periodically moving the selector bars in and out of position to control the signal generator, a latch for precluding the operation of the selector bars, means for momentarily disengaging the latch, timing means initiated into operation upon release of the latch, and means controlled by the timing means for maintaining the latch disengaged for a predetermined number of operations of the cyclically operable means.

18. In an automatic telegraph transmitter, a signal generator, a clutch adapted to control the signal generator, a plurality of selector bars, means for cyclically moving the selector bars into and out of position to control the signal generator, means actuated by one of the selector bars for releasing the clutch to initiate the signal generator into operation, a plurality of units having coded indicia thereon, blocking elements associated with each unit and adapted to be positioned in accordance with the coded indicia on the respective units, means for precluding the positionment of the blocking elements, and means for successively releasing the precluding means to permit the blocking elements to successively block movement of certain of the selector bars in accordance with the indicia of each unit.

References Cited in the file of this patent
UNITED STATES PATENTS

| Number | Name | Date |
|---|---|---|
| 2,357,297 | Wack et al. | Sept. 5, 1944 |
| 2,545,207 | Martindell | Mar. 13, 1951 |
| 2,574,362 | Warburton | Nov. 5, 1951 |
| 2,584,997 | Ferguson | Feb. 12, 1952 |